United States Patent
Shoulson et al.

(10) Patent No.: US 10,783,689 B2
(45) Date of Patent: Sep. 22, 2020

(54) SYSTEMS AND METHODS FOR GENERATING EVENT-CENTRIC ANIMATIONS USING A GRAPHICAL USER INTERFACE

(71) Applicant: Disney Enterprises, Inc., Burbank, CA (US)

(72) Inventors: Alexander Shoulson, Burbank, CA (US); Mubbasir Kapadia, Zurich (CH); Robert Sumner, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 230 days.

(21) Appl. No.: 14/946,041

(22) Filed: Nov. 19, 2015

(65) Prior Publication Data

US 2017/0148200 A1 May 25, 2017

(51) Int. Cl.
*G06T 13/40* (2011.01)
*G06T 13/00* (2011.01)
*G06F 3/0484* (2013.01)
*G06F 3/0482* (2013.01)
*G06F 3/0486* (2013.01)

(52) U.S. Cl.
CPC ............ *G06T 13/40* (2013.01); *G06F 3/0482* (2013.01); *G06F 3/0486* (2013.01); *G06F 3/04842* (2013.01)

(58) Field of Classification Search
CPC ................................ G06T 13/00; G06T 13/40
USPC ......................................................... 345/473
See application file for complete search history.

(56) References Cited

U.S. PATENT DOCUMENTS

| | | | | |
|---|---|---|---|---|
| 2003/0001843 A1* | 1/2003 | Suzuki | .................... | G06T 13/00 345/426 |
| 2004/0012593 A1* | 1/2004 | Lanciault | ................ | G06T 13/40 345/473 |
| 2009/0069084 A1* | 3/2009 | Reece | ..................... | A63F 13/10 463/32 |
| 2009/0143881 A1* | 6/2009 | Smyers | ................ | G11B 27/034 700/90 |
| 2013/0050224 A1* | 2/2013 | Gehani | ................... | G06T 13/80 345/473 |
| 2013/0132818 A1* | 5/2013 | Anders | ................... | G06T 13/00 715/234 |
| 2015/0221338 A1* | 8/2015 | Shaburova | ............. | G06T 5/005 386/281 |

* cited by examiner

*Primary Examiner* — Yi Yang

(74) *Attorney, Agent, or Firm* — Esplin & Associates, PC

(57) ABSTRACT

A user interface may be presented to a user that may provide an intuitive interface configured for generating animations. The user interface may be users of varying levels of expertise, while retaining the freedom of authoring complex narratives in an animation. A given narrative may be constrained by user input related to one or more of events to occur in an animation, individual animation components that may be included in the events, and/or other input. The system may be configured to "fill in" missing gaps in a narrative to generate a consistent animation while still meeting one or more narrative constraints specified by user input. By way of non-limiting example, gaps may be "filled in" by effectuating non-user selections of one or more of events, animation components, and/or other information used to generate an animation.

18 Claims, 5 Drawing Sheets

SYSTEMS AND METHODS FOR GENERATING EVENT-CENTRIC ANIMATIONS USING A GRAPHICAL USER INTERFACE

FIELD OF THE DISCLOSURE

This disclosure relates to generating event-centric animations using a graphical user interface.

BACKGROUND

Character animation may often be a complex undertaking. Some techniques used by animators may require substantial manual input, be time-consuming, and may be confined to experts. Generating even a few seconds of animation for a single character may require significant effort, and the authoring complexity may scale dramatically with many interacting characters and longer narratives. Some animation authoring packages target high-fidelity character animation where precision may be crucial for generating high-quality content. However, these may not be suited for previsualization, e.g., low- to mid-end content, and the growing trend of rapid content creation by casual users (e.g., Youtube). A key challenge may be to provide an appropriate interface that may accessible to users of varying levels of expertise.

Storyboards may provide an effective spatiotemporal visualization technique for films, comics, graphic novels, computer animation, and game design.

SUMMARY

One aspect of the disclosure relates to a system configured for generating event-centric animations. A user may provide input into a user interface to generate an animation to tell a story. One or more implementations of a user interface described herein may provide an intuitive interface configured for generating animations that may be easily accessible to users of varying levels of expertise, while retaining the freedom of authoring complex narratives in an animation.

Storyboards have conventionally provided an effective spatiotemporal visualization technique for films, comics, graphic novels, computer animation, and/or game design and may provide a natural visual metaphor for authoring narratives. One or more implementations of system describe herein may facilitate a visual authoring tool that empowers artists, content creators, and/or even casual users to quickly prototype and/or synthesize compelling multi-character animations while satisfying the narrative constraints imposed by the author. Users may provide input specifying one or more of a sequence of plot points (e.g., events) in an animation as parameterized storyboard elements, individual animation components to carry out the events, and/or other input.

To further ease the authoring burden, the system may facilitate identifying and resolving inconsistencies in an animation. This may allow users to be sparse in their specification, ignoring unimportant details and focusing only the significant events that are crucial to the narrative. Missing values of animation parameters may be automatically "filled in," for example, by adding additional events and/or animation components which may be needed to ensure a consistent and complete story, while meeting the authors original vision of the narrative. By way of non-limiting example, the system may be configured such that a user may be tasked with specifying one or more key events in a story and/or other information, thus allowing the user to focus on the storytelling process instead of the minutia involved in fine-grained character control and/or other animation generation input.

In some implementations, the system may include one or more physical processors that are configured by machine-readable instructions. Executing the machine-readable instructions may cause the one or more physical processors to facilitate generating event-centric animations. The machine-readable instructions may include one or more of animation information component, a user interface component, a criteria component, an automated selection component, an animation component, and/or other components.

The animation component may be configured to store animation information and/or other information. Animation information may include one or more of event information, animation component information, and/or other information. Animation component information may define animation components and/or other components of an animation. An animation component may include one or more of an actor, an object, an environment, and/or other components. Event information may define events portrayed in animations. An event may specify pre-defined, context-specific, interactions between animation components, and/or other information. Events may serve as the building blocks for authoring complex narratives. Animation component may be defined by values of one or more animation parameters.

By way of non-limiting example, event information of a given event may specify one or more coordinated interactions between animation components. Individual events being associated with event criteria. Events may comprise a first event and/or other events. The first event may be associated with first event criteria.

The user interface component may be configured to effectuate presentation of a user interface on computing platforms associated with users. The user interface component may be configured to obtain user input related to selection of one or more of event themes, events, animation components, and/or other information used for generating an animation. By way of non-limiting example, a user may make a selection of the first event and/or may provide other input via a user interface.

The criteria component may be configured to determine whether animation components selected by the user satisfy event criteria for individual ones of the selected events. In some implementations, the determination may be based on whether values of animation parameters that define selected animation components satisfy event criteria of selected events.

The automated selection component may be configured to effectuate non-user selections of one or more of values of animation parameters, animation components, events, and/or other information. In some implementations, non-user selection may be effectuated responsive to determining that event criteria may not be satisfied based on one or more user selections of events and/or animation components and/or based on an absence of user selections of animation components for individual ones of the events.

The animation component may be configured to generate an animation including instances of the selected events based on satisfaction of event criteria of the selected events. By way of non-limiting example, responsive to determining that the first event criteria may be satisfied based on a further selection by the user of a first animation component, the animation component may be configured to generate the animation including an instance of the first event that includes an instance of first animation component. By way of non-limiting example, responsive to determining that the first event criteria may not be satisfied, the automated selection component may be configured to effectuate a non-user selection of a second animation component and the animation component may be configured to generate the animation including an instance of the first event that includes an instance of the second animation component. The second animation component may be defined by values of animation parameters that satisfy the first event criteria.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
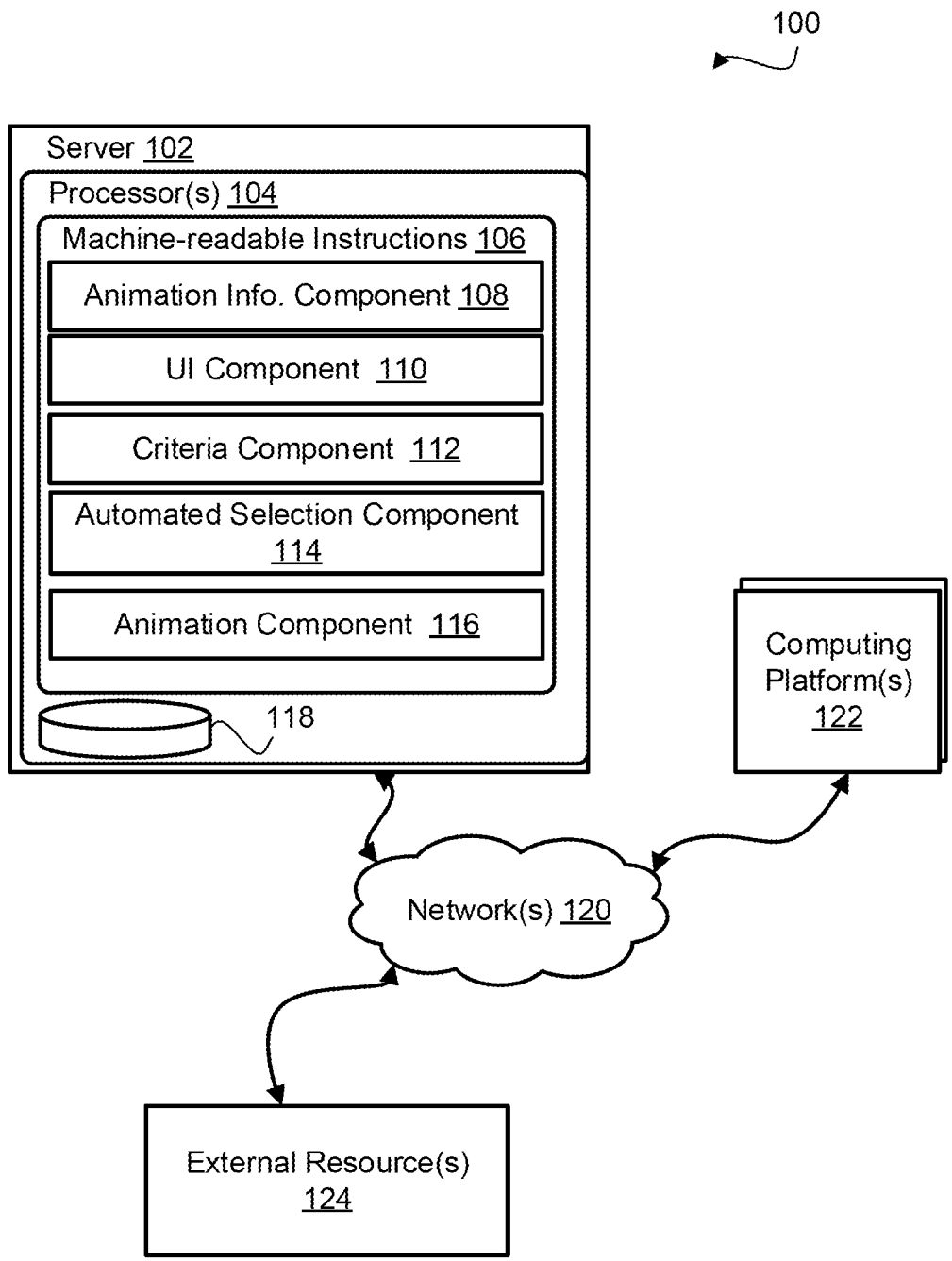
FIG. 1 illustrates a system configured for generating event-centric animations, in accordance with one or more implementations.

FIG. 1 illustrates a system 100 configured for generating event-centric animations. A user may provide input into a user interface to generate an animation to tell a story. One or more implementations of a user interface described herein may provide an intuitive interface configured for generating animations that may be easily accessible to users of varying levels of expertise, while retaining the freedom of authoring complex narratives in an animation. A given narrative may be constrained by user input related to one or more of events to occur in an animation, individual animation components that may be included in the events, and/or other input. The system may be configured to synthesize compelling narratives by generating significant plot points in the story based on events and/or other information. The system may be configured to "fill in" missing gaps to generate a consistent animation that meets one or more narrative constraints. By way of non-limiting example, gaps may be "filled in" by effectuating non-user selections of one or more of events, animation components, and/or other information used to generate an animation.

In some implementations, generating an animation in accordance with one or more implementations of system 100 herein may provide a technique for previsualization in filmmaking. Previsualization may serve as a means to experience a film while the story is still being written and/or refined. Some previsualization techniques may require expert users, making pre-visualization a costly process and limiting its practical impact. One or more implementations of system 100 may facilitate a previsualization technique that may be suitable for use by one or more of artists and directors to previsualize film storyboards in an iterative fashion, casual users providing arbitrarily sparse specifications and relying on automation for rapidly generating diverse animation narratives, and/or other users of other levels of expertise.

In some implementations, the system 100 may comprise a server 102, one or more computing platforms 122, and/or other components. The server 102 may include one or more physical processors 104 configured by machine-readable instructions 106 to generate event-centric animations. The machine-readable instructions 106 may include one or more of an animation information component 108 (abbreviated "Animation Info. Component 108" in FIG. 1), a user interface component 110, a criteria component 112, an automated selection component 114, an animation component 116, and/or other components.

In some implementations, the server 102 may be configured to provide remote hosting of the features and/or function of the machine-readable instructions 106 to one or more computing platforms 122 that may be remotely located from the server 102. In some implementations, one or more features and/or functions of server 102 may be attributed as local features and/or functions of one or more computing platforms 122. By way of non-limiting example, individual ones of the computing platforms 122 may include machine-readable instructions comprising the same or similar components as machine-readable instructions 106 of server 102. The computing platforms 122 may be configured to locally execute machine-readable instructions the same or similar to machine-readable instructions 106. The computing platforms 122 may include one or more of a cellular telephone, a smartphone, a laptop, a tablet computer, a desktop computer, a television set-top box, smart TV, a gaming console, and/or other computing platforms.

In FIG. 1, animation information component 108 may be configured to store animation information and/or other information. Animation information may include one or more of event information, animation component information, and/or other information.

Animation component information may define animation components and/or other components of an animation. An animation component may include one or more of an actor, an object, an environment, and/or other components.

An actor may comprise an entity within an animation having one or more roles within the animation. An actor may be of a type comprising one or more of a primary actor type (e.g., playing a lead role in an animation), a secondary actor type (e.g., playing a supporting role in an animation), an ambient actor type (e.g., playing a background role in an animation), and/or other types of actors. In some implementations, an actor may be represented by one or more of a human form (e.g., a human male or female), an animal form (e.g., a dog, a cat, a bear, and/or other animal form), a futuristic form (e.g., a robot, an alien, and/or other futuristic form), and/or other representations.

It is noted that the above description of actor animation components, actor types, and/or roles an actor may play in an animation is provided for illustrative purposes only and is not to be considered limiting. For example, in other implementations, actors may embody other roles within an animation.

An object may comprise an entity within an animation that may interact with actors, other objects, may be stationary, moveable, and/or configured in other ways. By way of non-limiting example, an object may comprise an entity that may be usable by an actor to carry out one or more tasks. In some implementations, an object may comprise a stationary and/or moveable object that may be positioned within an environment as part of the scenery of the environment. By way of non-limiting example, an object may comprise one or more of a tool, a weapon, an item of clothing, a currency, a vehicle, a topographical element, and/or other objects. A tool may comprise one or more of a key, a wrench, and/or other tools. A weapon may comprise one or more of a gun, a knife, bat, and/or other weapons. An item of clothing may comprise one or more of a shirt, pants, shoes, a hat, a uniform, and/or other items of clothing. A vehicle may comprise one or more of a car, an airplane, a skateboard, a motorcycle, and/or other vehicles.

It is noted that the above description of object animation components and/or use of object animation components by actors within an animation is provided for illustrative purposes only and is not to be considered limiting. For example, in other implementations, objects may embody other types of objects and/or may provide other roles within an animation.

An environment may comprise an ambient environment in which events of an animation may take place. An environment may comprise a simulated space in which actors and/or objects may move about. By way of non-limiting example, an environment may comprise one or more of an indoor space (e.g., a building, a vehicle, and/or other indoor space), an outdoor space (e.g., a park, a city block, and/or other outdoor space), and/or other environments. In some implementations, environments may include one or more objects disposed within the environment. By way of non-limiting example, an environment may comprise an office building. The office building may be populated with objects including one or more of desks, chairs, potted plants, and/or other objects.

It is noted that the above description of environment animation components within an animation is provided for illustrative purposes only and is not to be considered limiting. For example, in other implementations, environments may embody other types of environments within an animation.

In some implementations, animation components may be defined by one or more values of one or more animation parameters, and/or other information. Animation parameters may include one or more of actor parameters, object parameters, environment parameters, and/or other parameters.

Actor parameters may be associated with actors and/or other animation components. Values of actor parameters may define actors and/or other animation components. Actor parameters may include one or more of an appearance parameter, an abilities parameter, an inventory parameter, a location parameter, and/or other parameters.

Values of an appearance parameter of an actor may specify a visual appearance of the actor in an animation and/or other information. Visual appearance may comprise one or more of color, shape, form, size, clothing items the actor may be wearing (e.g., if applicable to the particular form of the actor), and/or other information that may specify a visual appearance of an actor in an animation. By way of non-limiting illustration, one or more values of an appearance parameter may specify that an actor is of a male human form, wears a trench coat and a hat, has brown eyes, and/or other information related to visual appearance within an animation.

Values of an abilities parameter of an actor may specify types of actions and/or tasks the actor may be configured to execute in an animation and/or other information. In some implementations, values of an abilities parameter may specify one or more of abilities of an actor to interact with and/or manipulate objects and/or other actors, sequences of movement the actor may carry out in order to complete a task and/or action, skills the actor may have, sounds (e.g., words, sentences, and/or other sounds) the actor may make, manners in which an actor may interact with other actors and/or objects, and/or other information related to actors' abilities within an animation. For example, a first value of a first abilities parameter may specify that a first actor may be configured to perform a first task. The first task may comprise manipulation of a first object in accordance with a first sequence of movements by the first actor.

By way of non-limiting illustration, one or more values of an abilities parameter for a given actor may specify one or more of an ability to interact with a vehicle object to drive the vehicle object, a sequences of movement the actor may carryout to interact with the vehicle object, and/or other information. For example, a sequence of movements may specify that to drive a car, an actor (e.g., of a human form and/or other forms) may move to a proximity of a vehicle, raise their arm so that their hand contacts a door handle of the vehicle, retract their arm to pull the handle to open the door, enter the vehicle, move into a seated position, grab the steering wheel, and/or other movements.

By way of non-limiting illustration, one or more values of an abilities parameter for a given actor may specify that an actor may make a sound (e.g., say a greeting) when the actor encounters another actor, and/or other information.

Values of an inventory parameter of an actor may specify one or more objects that may be included with the actor and/or may be otherwise provided to the actor. For example, one or more values of an inventory parameter of a first actor may specify that the first actor is provided a first object. By way of non-limiting illustration, a first value of a first inventory parameter may specify that an actor of an alien form may have a futuristic weapon.

Values of a location parameter of an actor may specify one or more of locations of an actor, movements the actor may carryout throughout an animation, and/or other information. By way of non-limiting example, one or more values of one or more location parameters may specify one or more of a starting location of an actor at the start of an animation, an ending location of the actor at the end of the animation, a current location of the actor, sequences of movement the actor may carry out to position themselves in one or more locations, and/or other information. By way of non-limiting example, a first value of a location parameter of a first actor may specify a first location of the first actor at the start of an animation. By way of non-limiting illustration, one or more values of a location parameter of a background role actor may specify one or more of a starting location, and ending location, and/or movement the background role actor may take to traverse from the starting location to the ending location. By way of further non-limiting illustration, within a bank environment, a background role actor may be a customer, and the customer may enter the bank and walk to a teller to stand in line.

Object parameters may be associated with objects and/or other animation components. Values of object parameters may define objects and/or other animation components portrayed in an animation. Object parameters may include one or more of an appearance parameter, an affordances parameter, an abilities parameter, a location parameter, and/or other parameters.

Values of an appearance parameter of an object may specify a visual appearance of the object in an animation and/or other information. The visual appearance may comprise one or more of color, shape, size, form, and/or other information. For example, one or more values of a visual appearance parameter of a first object may specify one or more of a form, a shape, a color, and/or other information related to appearance of the first object. By way of non-limiting illustration, a first object may comprise a weapon. One or more values of a visual appearance parameter may specify that the first object is formed to resembled a hand gun, is colored black, and/or other information related to appearance of the first object.

Values of an affordances parameter of an object may specify manners in which actors and/or objects may act upon the object. In some implementations, actors and/or objects may act upon other objects through one or more of passive actions, active actions, and/or other manners of interaction. For example, a first value of an affordances parameter of a first object may specify that actors and/or objects may act upon the first object in a first manner. By way of non-limiting illustration, one or more values of an affordances parameter of a chair object may specify that actors may "sit" upon the chair object. Further, values of an abilities parameter of a given actor may specify sequences of movement the actor may take in order to carry out the action of sitting on the chair.

By way of further non-limiting illustration, one or more values of an affordances parameter of a weapon object may specify that actors may grasp the weapon in their hand. By way of non-limiting illustration, one or more values of an affordances parameter of a desk object (e.g., incorporated into an environment) may specify that actors may not manipulate the desk object in any manner (e.g., the desk may remain stationary).

Values of an abilities parameter of an object may specify actions and/or tasks the object may be configured to execute in an animation and/or other information. An action and/or task of an object may be related to a form of the object (e.g., what the object "is"). By way of non-limiting example, a first value of an abilities parameter of a first object may specify that the first object may carry out a first action within an animation.

By way of non-limiting illustration, one or more values of an abilities parameter of a weapon object having a form of a gun may specify that the weapon object may shoot bullets when acted upon by an actor in a given manner. For example, one or more values of an abilities parameter of a given actor may specify sequences of movement the actor may take in order to carry out actions of one or more of holding a gun object, aiming the gun object, and/or pulling a trigger of the gun object to cause the gun object to shoot bullets.

By way of non-limiting illustration, one or more values of an abilities parameter of a door object may specify that the door object may be opened and/or closed when acted upon by an actor in a given manner.

Values of a location parameter of an object may specify locations of an object, movements the object may carryout throughout an animation, and/or other information. By way of non-limiting example, one or more values of one or more location parameters may specify one or more of a starting location of an object at the start of an animation, an ending location of the object at the end of the animation, a current location of the object, sequences of movement the object may carry traverse from the first location to the second location, and/or other information. By way of non-limiting example, a first value of a location parameter of a first object may specify a first location of the first object at the start of an animation.

Values of an environment parameter may specify an environment of an animation. By way of non-limiting example, a first value of an environment parameter may specify a first environment. By way of non-limiting illustration, the first value may specify "bank" and/or other environment.

It is noted that the above descriptions of animation parameters of animation components and values of animation parameters are provided for illustrative purposes only and is not to be considered limiting. For example, in other implementations, animation parameters may comprise other parameters and/or values of animation parameters may specify other information to define a given animation component.

Values of animation parameters that define animation components may comprise one or more of predetermined values, user-specified values, and/or other values determined by other techniques. By way of non-limiting example, values of animation parameters that define animation components may be predefined by an administrator of system 100. For example, a pool of various animation components predefined by values of animation parameters may be made available to a user at the onset of the implementation of system 100.

In some implementations, values of animation parameters that define animation components may be specified by users. For example, users may "create" animation components and/or other content suitable for inclusion in an animation by specifically defining values of animation parameters of animation components. This may be referred to generally as "user-generated content."

In some implementations, values of animation parameters of animation components included in an animation may define a state of the animation. By way of non-limiting example, a state of an animation at a given point in time may be defined by values of animation parameters of animation components of the animation at the point in time.

In some implementations, values of animation parameters that define animation components may change during an animation. By way of non-limiting example, events that may take place within the animation may cause the state of the amination to change, e.g., may cause one or more values of one or more animation parameters of animation components of the animation to change. By way of non-limiting example, an object and/or actor may be acted upon by one or more other objects and/or actors. In response to being acted upon, values of animation parameters of the object and/or actor may change.

By way of non-limiting illustration, an event may take place which may cause a location of an actor to change places. The value of a location parameter of the actor may change throughout the animation. By way of further non-limiting illustration an event may take place which may cause an object included in an inventory of an actor to be taken away (e.g., an actor having a gun may have the gun taken from them).

It is noted that the above descriptions of state of an animation and/or how values of animation parameters of animation components may change are provided for illustrative purposes only and is not to be considered limiting. For example, in other implementations, state of an animation may be defined by other information and/or values of animation parameters may change based on other occurrences in an animation.

In some implementations, event information may define events portrayed in animations. An event may specify predefined, context-specific, interactions between animation components, and/or other information. Events may serve as the building blocks for authoring complex narratives. By way of non-limiting example, event information of a given event may specify one or more coordinated interactions between animation components.

An individual instance of an event occurring within a animation may have a vastly different outcome depending on a current state of an animation, and/or other information. By way of non-limiting example, events may be carried out by a wide variety of animation components. Depending on one or more values of one or more animation parameters of animation components included in an event, the event may have a different outcome.

In some implementations, individual events may be associated with an event theme. An event theme may be associated with one or more narratives. By way of non-limiting example, an event theme may be associated with one or more events that may be used to convey a given narrative.

By way of non-limiting example, a first theme may be associated with a first set of events. The first of events may include one or more of a first event, a second event, a third event, and/or other events. One or more narratives may be established based one or more of a selection of events from the first set of events to include in an animation, an order in which selected events may take place, a selection of one or more events to take place simultaneously, and/or other user (or non-user) selections.

Events may be associated with event criteria, and/or other information. Event criteria may reflect minimum requirements of animation state needed for an event to take place. By way of non-limiting example, event criteria may specify sets of values of one or more animation parameters. Event criteria may be satisfied based on a given state of an animation being defined by at least of the one value from individual sets of values of individual ones of the one or more animation parameters specified by the event criteria.

By way of non-limiting example, events may comprise a first event, and/or other events. The first event may be associated with first event criteria, and/or other information. The first event criteria may specify a first set of values of a first animation parameter and/or other values for other animation parameters. The first event criteria may be satisfied based on a current state of an animation being defined by at least one of the values in the set of values of the first animation parameter. Satisfaction of the first event criteria may convey that a minimum state of the animation is met such that the first event may take place.

In some implementations, the first set of values of the first animation component may include one or more of a first value, a second value, and/or other values. In some implementations, based on a current state of the animation being defined by the first value of the first animation parameter that satisfies a state requirement of an animation such that the first event may take place, the occurrence of the first event may have a first outcome. In some implementations, based on the current state of the animation being defined by the second value of the first animation parameter that satisfies the state requirement of an animation such that the first event may take place, the occurrence of the first event may have a second outcome. The first outcome may be different from the second outcome.

By way of non-limiting illustration, the first event may specify a first interaction between a first actor and a second actor. The first interaction may comprise the first actor "incapacitating" the second actor with a weapon, and/or other type of interaction. The first event criteria may be associated with a minimum state of the animation required for the first event to take place. By way of non-limiting example, the first event criteria may specify values of animation parameters conveying one or more of the first actor and second actor being proximately located near one another, the first actor having a weapon, the first actor being afforded the ability to perform the action of "incapacitate" with the weapon, and/or other information. By way of non-limiting illustration, an event comprising "incapacitate" may be associated with a "bank robbery" type narrative. In some implementations, the first animation parameter may be an inventory parameter. The first set of values of the first animation parameter may specify weapons in the first actor's inventor comprising one or more of a gun, a knife, a bat, and/or other weapons. The first event criteria may be satisfied based on the first actor having at least one of a gun, a knife, a bat, and/or other weapons specified in the first set of values.

By way of further non-limiting illustration, the first value may be "bat." The second value may be "gun." In some implementations, the first outcome may be that the second actor is "incapacitated" by being knocked out with the bat. The second outcome may be that the second actor is "incapacitated" by being shot and killed with the gun.

It is noted that the above descriptions of events, interactions occurring in events, and/or outcomes of events are provided for illustrative purposes only and is not to be considered limiting. For example, in other implementations, events may convey other types of interactions associated with other narratives of an animation.

User interface component 110 may be configured to effectuate presentation of a user interface on computing platforms associated with users of system 100. The user interface component 110 may be configured to obtain user input related to selection of one or more of event themes, events, animation components, and/or other information used for generating an animation. A user interface may include one or more of one or more user interface elements, one or more display windows, one or more display elements, and/or other components. Individual user interface element may be selectable by a user. Individual ones of the user interface elements may represent one or more of events, animation components, and/or other components of an animation that a user may select to generate an animation.

By way of non-limiting illustration, a user interface element representing an event may comprise one or more of an icon, a check box, a drop down menu, and/or other representations within a user interface. An icon may include one or more of a graphical representation of an event, a description of an event, a name of an event and/or other information. A user interface element representing an animation component may comprise one or more of an icon, a check box, a drop down menu, and/or other representations. By way of non-limiting example, a drop down menu may include a list of values of animation parameters that may be selected by a user to define an animation component for a given event, other information.

In some implementations, a display window may be configured to display representations of one or more events that may have be selected by a user to generate an animation that includes instances of the selected events.

In some implementations, a display window may provide an area of a user interface where user selections of user interface elements may be effectuated to generate an animation. In some implementations, display area may include display elements that may guide a user to position selected events with respect to sequential occurrence, simultaneous occurrence, and/or other may facilitate other functions. By way of non-limiting example, display elements may include placeholders representing "slots" where individual events may be placed to establish a temporal positioning of selected events within an animation.

By way of non-limiting example, user interface elements may be provided to the display window in accordance with one or more of a desired sequence of events, desired simultaneous occurrence of events, and/or may facilitate other functions to effectuate a user selection. By way of non-limiting example, individual user interface elements may be selectable by a user and provided within a display window to effectuate the selections via one or more of a drag-and-drop techniques, drop down menus, check boxes, and/or other techniques.

In some implementations, a user may provide input into a user interface of an event theme to populate a display window of the user interface with one or more events that may be selectable by the user.

Figure 2:
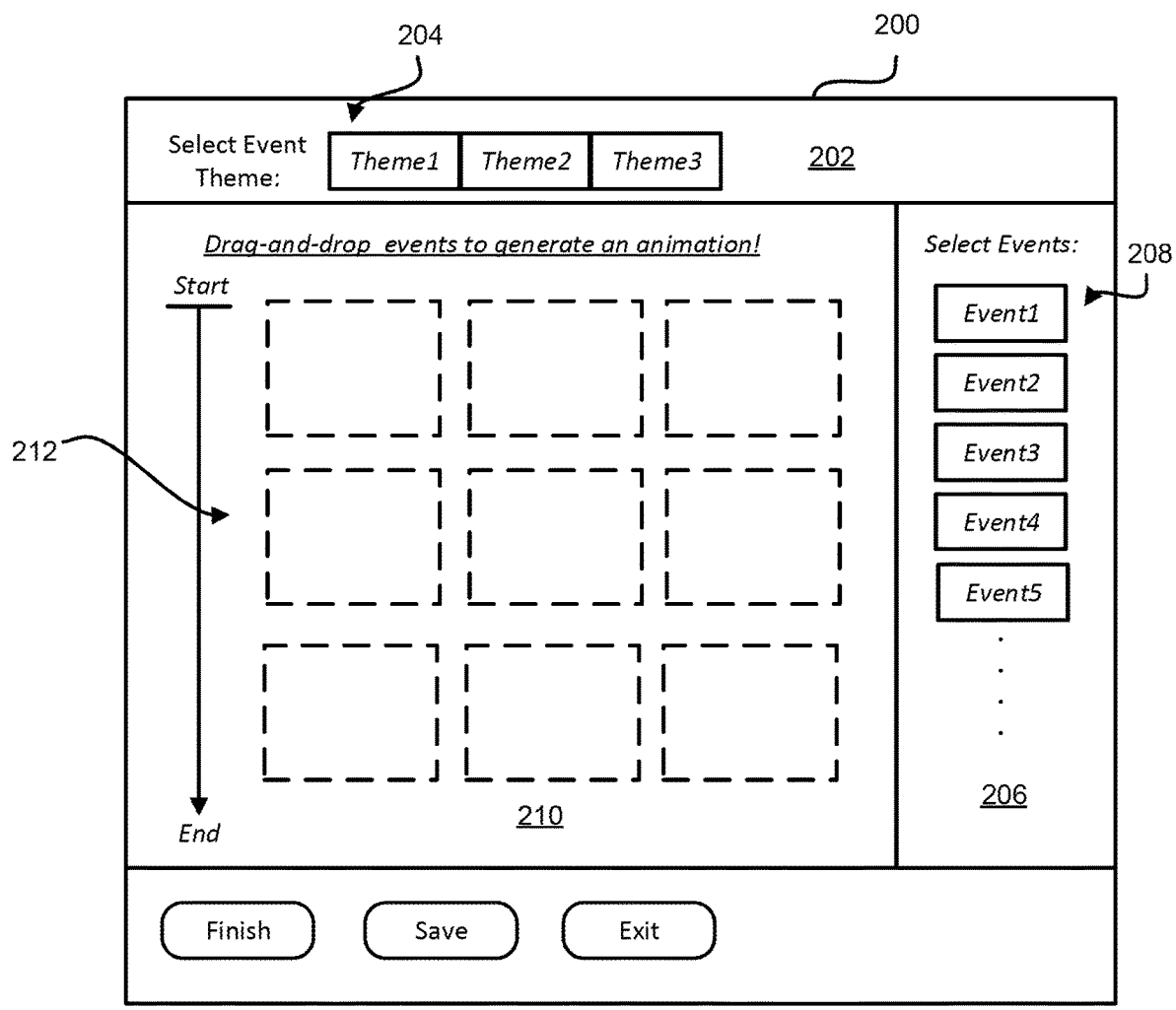
FIG. 2 illustrates an exemplary implementation of a user interface configured to receive user input for generating animations.

By way of non-limiting illustration, FIG. 2 illustrates an exemplary user interface 200 configured to receive user input for generating event-centric animations. The user interface 200 may include one or more of a first display window 202, a first set of user interface elements 204, a second display window 206, a second set of user interface element 208, a third display window 210, a first set of display elements 212 (e.g., placeholders depicted by dashed boxes), and/or other display windows, display elements, and/or user interface elements.

In some implementations, the first set of user interface elements 204 may comprise user interface elements representing various event themes that may be selected. By way of non-limiting example, the event themes may comprise one or more of a first theme (e.g., "Theme1"), a second theme (e.g., "Theme2"), a third theme (e.g., "Theme3"), and/or other themes. In some implementations, the first theme may correspond to a first narrative and/or other narrative. The second theme may correspond to a second narrative and/or other narratives. The third them may correspond to a third narrative and/or other narratives. It is noted that although three themes are currently depicted, this is for illustrative purposes only and not to be considered limiting. For example, in other implementations, more or fewer event themes may be selectable by a user that corresponds to other narratives. User selection of an event theme may facilitate populating second display window 206 with user interface element representing events.

In some implementations, the second set of user interface elements 208 may represent events that correspond to an event theme. By way of non-limiting example, individual user interface elements in the second set of user interface element 208 may individually represent an event that may be selected. Individual ones of the user interface element in the second set of user interface elements 208 may comprise icons and/or other representations of events. For example, the events may include one or more of a first event (e.g., "Event1"), a second event (e.g., "Event2"), a third event (e.g, "Event3"), a fourth event (e.g., "Event4"), a fifth event (e.g., "Event5"), and/or other events. It is noted that although three events are currently depicted, this is for illustrative purposes only and not to be considered limiting. For example, in other implementations, more or fewer events may be populated within second window 206 that may correspond to a given event theme.

In some implementations, individual display elements within the first set of display elements 212 displayed within third display window 210 may be arranged to convey various temporal positions where events may take place. By way of non-limiting example, the first set of display elements 212 may be arranged in a grid that may represent one or more of a temporal sequencing of event occurrences, simultaneous occurrences of events, and/or other information. For illustration, a temporal sequencing of events may be represented by a vertical axis of the grid. For illustration, simultaneous occurrence of events may be represented by horizontal axis of the grid. It is noted that although a gird arrangement is currently depicted, this is for illustrative purposes only and not to be considered limiting. For example, in other implementations, display elements may be displayed in other manners to convey temporal positioning of events within an animation.

Figure 3:
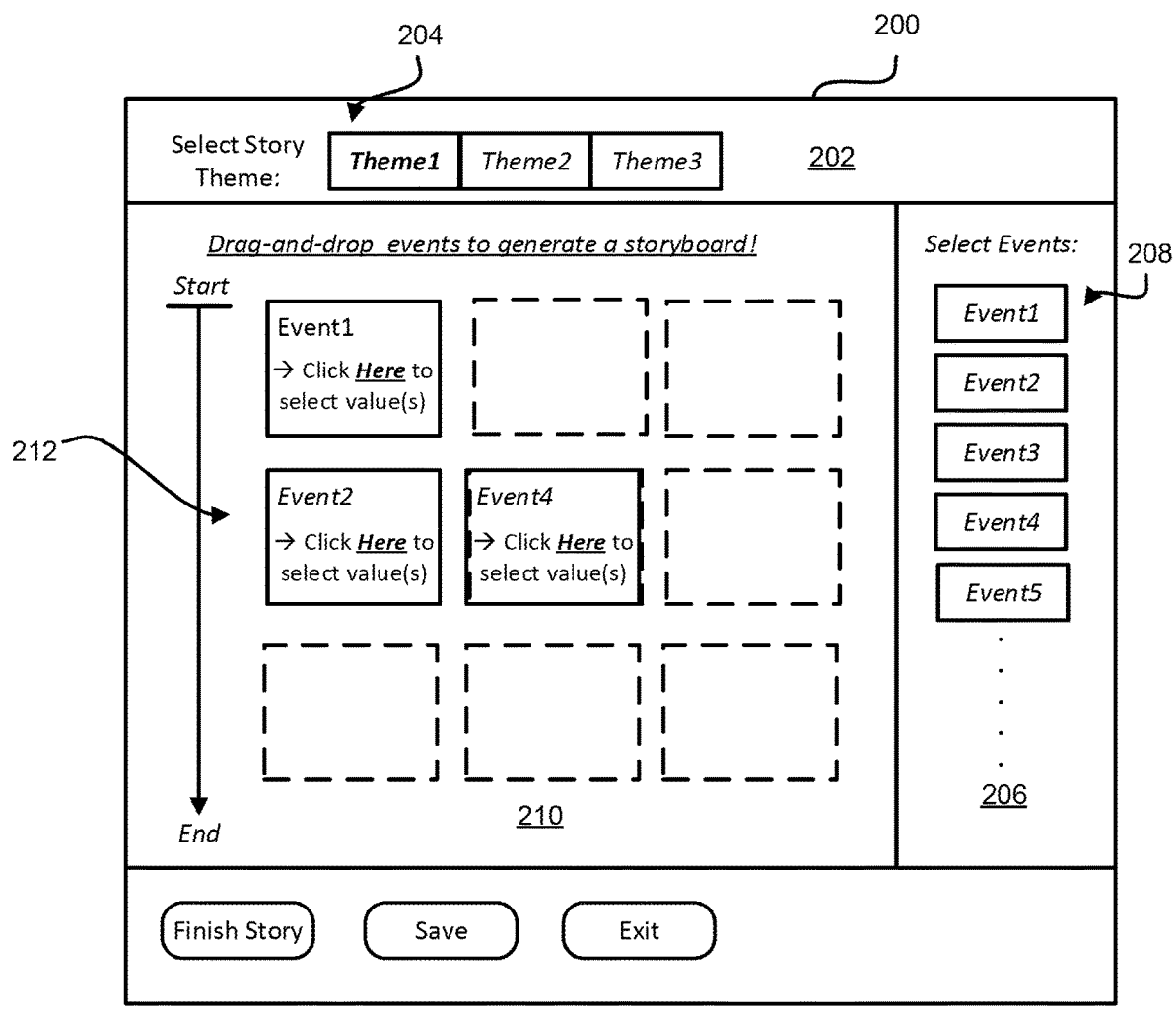
FIG. 3 illustrates another exemplary implementation of a user interface configured to receive user input for generating animations.

FIG. 3 illustrates another implementation of user interface 200 of FIG. 2 showing user selection of one or more events. By way of non-limiting example, a user may select individual events from second window 206 and provide the individual events to individual placeholders included in the first set of display elements 212 in third display window 210 to effectuate the user selections. For illustration, the user selection shown in FIG. 3 currently depicts the first event being selected to occur temporally before the second event (e.g., the first event being positioned at a top left corner of the grid and/or the second event being positioned below the first event along the vertical axis of the grid), and the fourth event may be selected to occur simultaneously with the second event (e.g., the fourth event being positioned next to the second event along a horizontal axis of the grid).

In some implementations, the user interface 200 may be configured to receive user input of animation components to include in individual ones of the events. User selection of animation components may be facilitated by one or more other user interfaces (e.g., a pop-up user interface), and/or other techniques.

Figure 4:
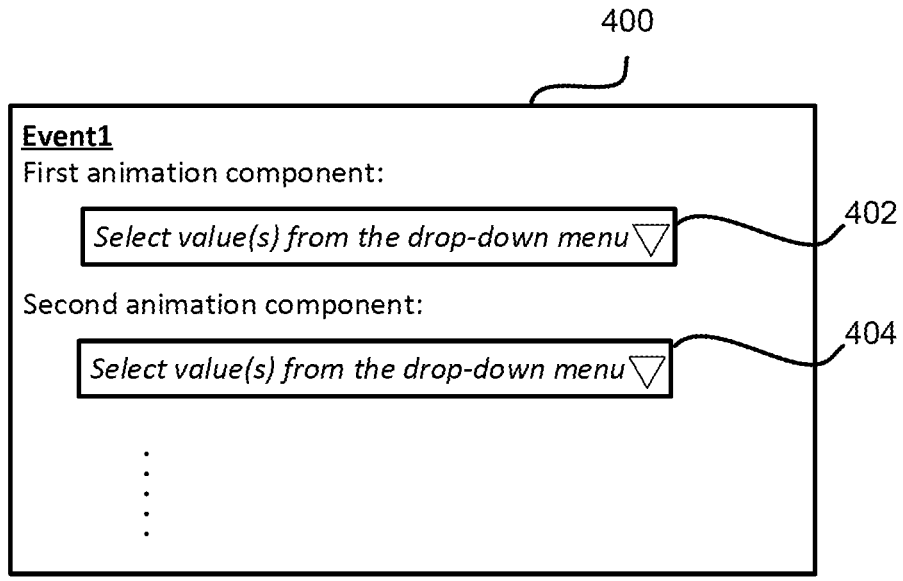
FIG. 4 illustrates another exemplary implementation of a user interface configured to receive user input for generating animations.

By way of non-limiting illustration, FIG. 4 depicts second user interface 400 configured to facilitate user selection of one or more animation components for individual ones of the events. For illustrative purposes, second user interface 400 may comprise an interface used for selecting animation components for the first event shown in FIG. 3. By way of non-limiting illustration, the first event may define an interaction between a first animation component, a second animation component, and/or other animation components.

In some implementations, user selection of an animation component may comprise selections of values of one or more animation parameters of the animation component used to define the animation component. In some implementations, user selection of values of one or more animation parameters may be facilitate by one or more of a drop down menu, check boxes, and/or other techniques. By way of non-limiting illustration, second user interface 400 may include one or more of a first drop down menu 402 for selecting values of animation parameters of the first animation component, a second drop down menu 404 for selecting values of animation parameters of the second animation component, and/or other elements. It is noted that selections of animation components for other events may be facilitated in a same or similar manner as that described for the first event.

Figure 5:
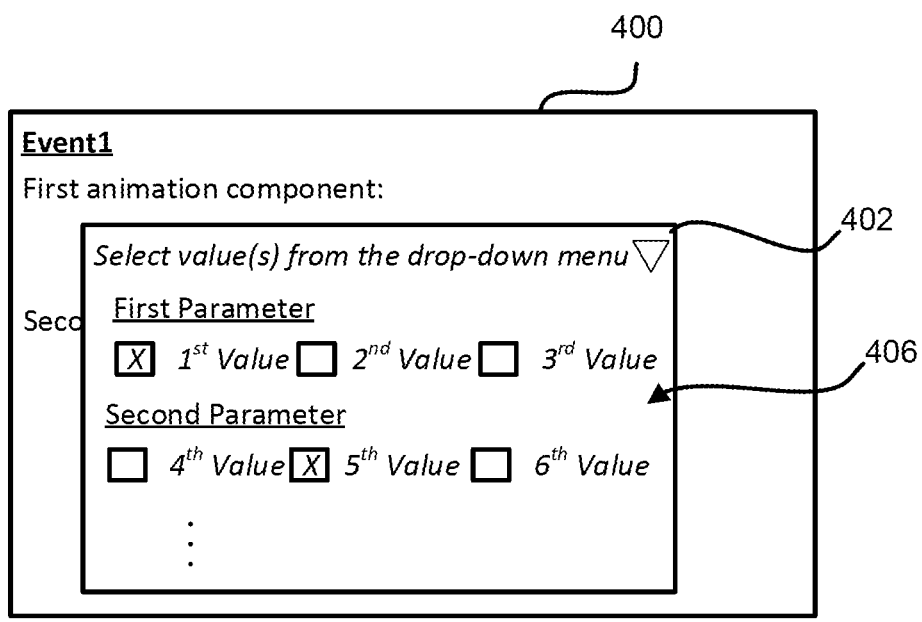
FIG. 5 illustrates another exemplary implementation of a user interface configured to receive user input for generating animations.

FIG. 5 illustrates another view of second user interface 400 of FIG. 4 after user selection of first drop down menu 402. First drop down menu 402 may include a set of check boxes 406 configured to receive user selection of values for one or more of a first animation parameter, a second animation parameter, and/or other animation parameters of the first animation component. For example, a first animation parameter may be defined by one or more of a first value, a second value, a third value, and/or other values. Although not shown, the second drop down menu 404 may include the same or similar elements and/or functionality as first drop down menu 402 to facilitate selection of values of one or more animation parameters that may define the second animation component.

To provide an illustration of an application of second user interface 400 shown in FIG. 4 and FIG. 5, the previously described event corresponding to a first actor "incapacitating" a second actor may be considered as the first event. The first animation component may represent the first actor and the second animation component may represent the second actor. Referring to FIG. 5, the first animation parameter may correspond to an appearance parameter of the first actor. The first value may define an appearance as "human," the second value may define an appearance as an "alien," and the third value may define an appearance as a "dog." The user may select the first value and/or other values. The second animation parameter may correspond to the inventory parameter and/or other parameters. The fourth value may define knife weapon, the fifth value may define a gun weapon, and the sixth value may define a bat weapon. The user may select the fifth value. Thus, user selection via first drop down menu 402 of second user interface 400 may facilitate user selection of a first animation component for the first event that may comprise a human actor that has a gun.

Returning to FIG. 1, the criteria component 112 may be configured to determine whether animation components selected by the user satisfy event criteria for individual ones of the selected events. Determining whether animation components selected by the user satisfy event criteria may comprise determining whether state of an animation determined at points in time when instances of selected events are to occur would satisfy minimum state requirements for the selected events to occur at respective ones of the points in time. By way of non-limiting example, determining whether state of an animation determined at points in time would satisfy minimum state requirements may be based on determining whether the values of animation parameters determined at the points in time would satisfy values of animation parameters specified by event criteria.

In some implementations, determinations of whether event criteria for events that occur after other events may be based on values of animation parameters after occurrences of the preceding events. For example, one or more events that occur prior to a given event may be evaluated to determine whether values of animation parameters after occurrence of the one or more prior events would satisfy event criteria of the given event. By way of non-limiting example, outcome(s) of one or more prior events may be determined based on current animation components selected to be included in the one or more prior events. Values of animation parameters corresponding to the outcome(s) may be determined and compared against event criteria of an event that is to occur after the one or more prior events.

By way of non-limiting example, user-selected events may comprise a first event, a second event, and/or other events. The first event may be associated with first event criteria. The second event may be associated with second event criteria. The first event may be selected to take place at a first point in time in an animation. The second event may be selected to take place at a second point in time the animation. The first point in time may be temporally before the second point in time. By way of non-limiting example, the second point in time may correspond to an occurrence of an outcome of the first event. In some implementations, the first event may comprise a start of the animation, e.g., may be a temporally first event selected to occur in the animation.

In some implementations, the user-selected animation components for the first event may comprise one or more of a first animation component and/or other animation. User selected animation components of the second event may comprise one or more animation components.

In some implementations, the criteria component 112 may be configured to determine whether the first animation component and/or other animation components selected by the user satisfies the first event criteria. The determination may comprise determining whether a first state of an animation determined at the first point in time would satisfy minimum state requirements for the first event. Determining whether the first state of an animation determined at the first point in time would satisfy minimum state requirements for the first event may comprise determining whether values of animation parameters that define the first animation component would satisfy values of animation parameters specified by the first event criteria. Given that the first event may comprise the start of the animation, the values of the animation parameters of the first animation component may comprise predefined values (e.g., that have not yet changed due to occurrences of prior events in the animation).

By way of non-limiting illustration, the first event criteria may specify a first set of values of a first animation parameter. The criteria component 112 may be configured to determine that the first event criteria is satisfied based on the value of the first animation parameter that defines the first animation component being at least one of the values in the first set of values. For example, criteria component 112 may perform a comparison of the value of the first animation parameter of the first animation component with the values included in the first set of values.

In some implementations, the criteria component 112 may be configured to determine whether the second event criteria may be satisfied at the second point in time based on determining values of animation parameters after the occurrence of the first event. For example, an outcome of the first event may be determined based on the inclusion of the first animation component in the first event. Values of one or more animation parameters corresponding to the outcome of the first event may be determined. The values of the one or more animation parameters at the outcome may be compared to values specified in the second event criteria.

It is noted that although the above descriptions of determining whether criteria is satisfied for a first event and second event that follows the first event, users selections may include one or more intervening events between the first event and second event, one or more occurring events simultaneously with the first event and/or second event, and/or one or more subsequent events following the second event. In such instances, the criteria component 112 may be configured to determine whether event criteria for the one or more other events are satisfied based on determining whether outcomes of prior events may establish minimum state requirements by a point in time at which subsequent event are to take place.

In some implementations, users may not make selections of animation components to be included in individual ones of the events. In such cases, criteria component 112 may determine that event criteria has not been satisfied by user selections since an outcome of a given event may not be readily determined without knowing what animation components are to be included in the events.

The automated selection component 114 may be configured to effectuate non-user selections of one or more of value of animation parameters, animation components, events, and/or other information. In some implementations, non-user selection may be effectuated responsive to determining that event criteria may not be satisfied based on one or more user selections of events and/or animation components and/or based on an absence of any user selections of animation components for individual ones of the events. In general, non-user selections may include selections which cause event criteria of individual events to be satisfied at points in time when individual ones of the events are to occur. Non-user selections may be provided as substitutes that replace user selections and/or may be provided to supplement user selections.

In some implementations, non-user selections of animation components may comprise selections of animation components for individual events that have values of animation parameters that match values of animation parameters specified in event criteria of the individual events. By way of non-limiting illustration, following the examples describe above with respect to criteria component 112, responsive to determining that the user selection of the first animation component (e.g., having the first value of the first animation component) for the first event does not satisfy the first event criteria of the first event, automated selection component 114 may be configured to effectuate a non-user selection of another animation component defined by values of animation parameters that will satisfy the first event criteria. In some implementations, the non-user selection of the other animation component may replace the user selection of the first animation component.

In some implementations, a substituted animation component may comprise an animation component that may be different than the first animation component, and/or the substituted animation component may comprise the first animation component having one or more substituted values of one or more animation parameters. By way of non-limiting illustration, responsive to determining that the user selection of the first animation component (e.g., having the first value of the first animation component) for the first event does not satisfy the first event criteria of the first event, automated selection component 114 may be configured to effectuate a substitution of the first value with another value that will satisfy the first event criteria.

In some implementations, responsive to the user not selecting one or more animation components for the first event, automated selection component 114 may be configured to effectuate a non-user selection of an animation component defined by values of animation parameters that will satisfy the first event criteria such that the first event may take place.

In some implementations, non-user selections of events may comprise selections of events and/or animation components to be included in the events, such that occurrences of non-user selected events and/or user selected events may have outcomes that meet state requirements of one or more subsequent events. Continuing the examples provided above with respect to criteria component 112, in some implementations, responsive to determining that the second event criteria may not satisfied based on values of animation parameters after the occurrence of the first event (e.g., including either the user selection of the first animation component or the non-user selection of the other animation component), automated selection component 114 may be configured to effectuate a non-user selection of a third event, one or more animation components to be included in the third event, and/or other events. The third event may be selected to occur either simultaneously with the first event, or after the first event and before the second event. The selection of the third event may be such that values of animation parameters after either the simultaneous occurrence of the third event and first event, or after the occurrence of the third event following the first event, may satisfy the second event criteria such that the second event may take place.

In some implementations, in addition or alternative to the approach described above where a third event may be selected, responsive to determining that the second event criteria may not satisfied based on either the user selection of the first animation component in the first event, or the non-user selection of the other animation component to replace the first animation component in the first event, automated selection component 114 may be configured to effectuate a substitution of either the user selection of the first animation component or the non-user selection of the other component that replaced the first animation component, with another non-user selection of yet another animation component. The yet another animation component may be selected such that the yet another animation component both satisfies event criteria of the first event, and causes the outcome of the first event to satisfy the second event criteria such that the second event may subsequently take place.

It is noted that the above illustration is not intended to be limiting. For example, the above approach may be performed for additional one or more events that may be selected to occur either simultaneously with the first event and/or second event, and/or subsequent to the second event.

Returning to FIG. 1, animation component 116 may be configured to generate an animation including instances of one or both of user-selected events and/or non-user selected events based on satisfaction of event criteria of the user-selected events and/or non-user selected events.

By way of non-limiting example, responsive to determining that the first event criteria and/or second event criteria may be satisfied based on either user selections or non-user selections, animation component 116 may be configured to generate an animation including an instance of the first event, an instance of the second event, and/or other instances of other events.

In FIG. 1, server 102, computing platforms 122, and/or external resources 124 may be operatively linked via one or more electronic communication links. For example, such electronic communication links may be established, at least in part, via a network 121 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts, and/or providers of virtual spaces outside of system 100, external entities participating with system 100, external entities for player-to-player communications, and/ or other resources. In some implementations, some or all of the functionality attributed herein to external resources 124 may be provided by resources included in system 100.

As an illustrative example of an implementation of system 100, the following "bank robbery" narrative may be considered. Such a narrative may correspond to a theme a user may select via a user interface (e.g., user interface 200 of FIG. 2). Some events that may correspond to this theme may include one or more of "CoerceIntoUnlockDoor," "Incapacitate," "WarningShot," "TakeWeaponFromIncapacitated," "DistractAndIncapacitate," "PressButton," "LockDoor," "Flee," and/or other events.

The event of "CoerceIntoUnlockDoor" may be associated with event criteria that may convey minimum animation state required for the event to take place. The event criteria may specify values of animation parameters corresponding to one or more of presence of a first actor and a second actor, and a door object, and/or other criteria. The event criteria may further specify values of animation parameters corresponding that first actor having a weapon, the second actor having a key to open the door, the first actor having an ability to "coerce," the second actor having an ability to "open the door with the key," and/or other criteria.

The event of "Incapacitate" may be associated with event criteria that may convey minimum animation state required for the event to take place. The event criteria may specify values of animation parameters corresponding to one or more of presence of a first actor and a second actor, the first actor having a weapon, the first actor having an ability to "incapacitate," and/or other criteria.

The event of "WarningShot" may be associated with event criteria that may convey minimum animation state required for the event to take place. The event criteria may specify values of animation parameters corresponding to one or more of presence of a first actor, the first actor having a weapon (e.g., a gun), the first actor having an ability to fire the weapon, and/or other criteria.

The event of "TakeWeaponFrom Incapacitated" may be associated with event criteria that may convey minimum animation state required for the event to take place. The event criteria may specify values of animation parameters corresponding to one or more of presence of a first actor and a second actor, the second actor having a weapon, the first actor having an ability to take the weapon after the second actor is incapacitated, and/or other criteria.

The event of "DistractAnd Incapacitate" may be associated with event criteria that may convey minimum animation state required for the event to take place. The event criteria may specify values of animation parameters corresponding to one or more of presence of a first actor, a second actor, and a third actor; at least one of the actors having an ability to "distract," at least one actor having a weapon, at least one of the actors having an ability to "incapacitate," and/or other criteria. By way of non-limiting illustration, two robbers may cooperate to distract and incapacitate a guard using this event.

The event of "PressButton" may be associated with event criteria that may convey minimum animation state required for the event to take place. The event criteria may specify values of animation parameters corresponding to one or more or presence of a first actor and a button, the first actor having an ability to press the button, and/or other criteria.

The event of "LockDoor" may be associated with event criteria that may convey minimum animation state required for the event to take place. The event criteria may specify values of animation parameters corresponding to one or more or presence of a first actor and a door, the first actor having a key, the first actor having an ability to lock the door, and/or other criteria.

The event of "Flee" may be associated with event criteria that may convey minimum animation state required for the event to take place. The event criteria may specify values of animation parameters corresponding to one or more or presence of a crowd of actors, individual ones of the actors in the crowd being configured to disperse responsive to some action within the animation, and/or other criteria. By way of non-limiting example, a crowd may flee in response to a robber firing a warning shot.

Based on the above events, a user may make selection of individual ones of the events and/or animation components to be included in the events in order to design a bank robbery narrative in an animation. By way of non-limiting example, a narrative may comprise two robbers entering a bank, incapacitating a guard to take the guards key, using the key to open a door, pressing a button to open a safe, and/or other plot points. In some implementations, a user may provide a level of detail of their input according to their skill level and/or desires. Based on user selections and determinations of whether event criteria may be satisfied, one or more non-user selections may be effectuated to ensure criteria is satisfied. By way of non-limiting illustration, a user may simply provide input related to selections of events and when they may occur with or without providing selections of animation components to include in the events. The system 100 may be configured to "fill in" any missing information required to satisfy event criteria by effectuating non-user selections of one or more of animation components, values of animation components, events, and/or other information.

By way of non-limiting illustration, a user may only select events that map to climactic plot points in an animation without specifying one or more intermediate events that may lead up to the climactic plot point events. For example, a user may make selections that may comprise a partially-complete animation having a narrative where a bank robber steals money from a safe inside the bank. The user selection may include one or more of a first event including a first actor that fires a warning shot; the first actor being a robber; a second event including the first actor coercing a second actor to unlock a door; the second actor being a bank teller; and/or other selections. In order for the first event to occur, the first actor must have a weapon. As such, the system 100 may be configured to effectuate one or more non-user selection corresponding to a third event that takes place before the first event, wherein the third event comprises the first actor incapacitating a guard character having a weapon and the first actor taking the weapon. In order for the second event to occur, the bank teller must have a key. As such, the system 100 may be configured to effectuate one or more non-user selection corresponding to a fourth event that takes place simultaneously with the third event, wherein the fourth event comprises the second actor grabbing a key from inside a drawer.

The above description of an implementation of system 100 for generating an animation having a bank robbery narrative is provided for illustrative purposes only and is not to be considered limiting. For example, other animations having other narratives, events, and/or animation components may be generated using techniques contemplated by the present disclosure.

In FIG. 1, the server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, and/or 116. Processor 104 may be configured to execute components 108, 110, 112, 114, and/or 116 by software; hardware; firmware; some combination of software, hardware, and/or firmware; and/or other mechanisms for configuring processing capabilities on processor 104.

It should be appreciated that although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 108, 110, 112, 114, and/or 116.

Figure 6:
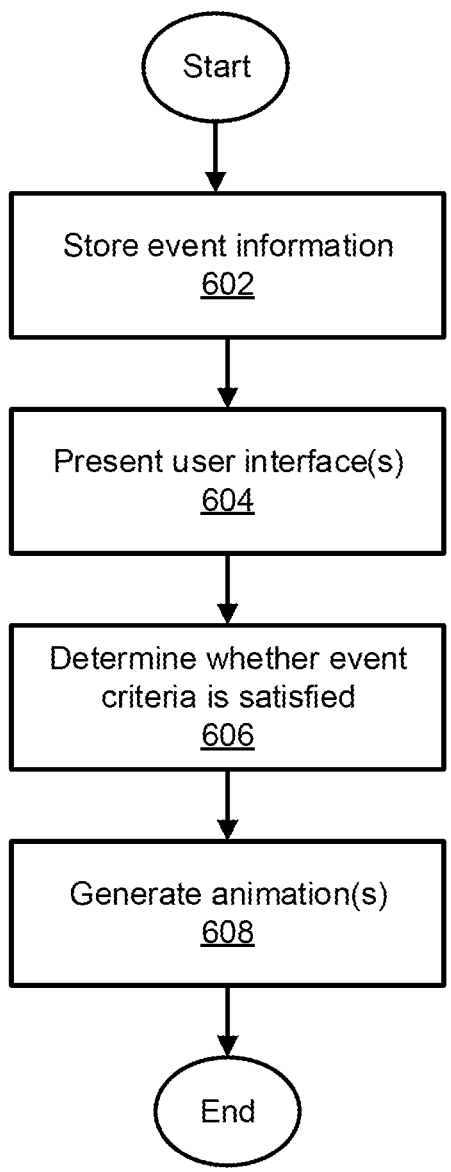
FIG. 6 illustrates a method of generating event-centric animations, in accordance with one or more implementations.

FIG. 6 illustrates a method 600 of generating event-centric animations, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 600 in response to instructions stored electronically on electronic storage media. The one or more processing devices may include one or more devices configured through hardware, firmware, and/or software to be specifically designed for execution of one or more of the operations of method 600.

At an operation 602, event information may be stored. Event information may define events portrayed in animations. Individual events may be associated with event criteria. Event may comprise a first event and/or other events. The first event may be associated with first event criteria. In some implementations, operation 602 may be performed by one or more physical processor executing an animation information component that is the same as or similar to animation information component 108 (shown in FIG. 1 and described herein).

At an operation 604, one or more user interfaces may be presented. A given user interface may be configured to receive user selection of events, individual animation components to be included in the events, and/or other input. Individual animation components may be defined by values of animation parameters. By way of non-limiting example, a user may make a selection of the first event the user interface. In some implementations, operation 604 may be performed by one or more physical processors executing a user interface component that is the same as or similar to user interface component 110 (shown in FIG. 1 and described herein).

At an operation 606, determinations of whether animation components selected by the user satisfy event criteria for individual ones of the selected events may be made. Determinations may be based whether values of animation parameters that define selected animation components satisfy event criteria of selected events. In some implementations, operation 606 may be performed by one or more physical processors executing a criteria component that is the same as or similar to criteria component 112 (shown in FIG. 1 and described herein).

At an operation 608, animations that include instances of selected events may be generated based on satisfaction of event criteria of the selected events. In some implementations, operation 608 may be performed by one or more physical processors executing one or more of an automated selection component and/or an animation component that are the same as or similar to automated selection component 114 and/or animation component 116, respectively (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate event-centric animations, the system comprising:
 one or more physical processors configured by machine-readable instructions to:
  store event information that defines events portrayed in animations, the events comprising plot points for stories conveyed in the animations, wherein individual events are associated with event criteria, and wherein the events comprise a first event associated with first event criteria;
  effectuate presentation of a user interface, the user interface being configured to receive user selection of individual ones of the events portrayed in the animations and animation components to be included in the events, the animation components including entities portrayed in the animations, wherein individual animation components are defined by values of animation parameters, wherein the animation parameters include one or more object parameters, and wherein individual object parameters are associated with the individual ones of the entities portrayed in the animations, and wherein the values of the individual object parameters define manners in which individual entities interact with other individual entities in the animation;
  determine whether the animation components selected by a user satisfy the event criteria for individual ones of selected ones of the events, the selected ones of the events including the first event; and
  generate an animation including instances of the selected ones of the events based on satisfaction of event criteria of the selected ones of the events, such that:
   responsive to determining that the first event criteria is satisfied based on a further selection by the user of a first animation component including a first entity, generate the animation including an instance of the first event that includes an instance of the first animation component; and
   responsive to determining that the first event criteria is not satisfied based on the further selection of the first animation component including the first entity, effectuate a non-user selection of a second animation component including a second entity that has a separate visual depiction from the first entity, wherein the second animation component is defined by the values of the animation parameters that satisfy the first event criteria, and generate the animation including an instance of the first event that includes an instance of the second animation component;
   wherein the second animation component replaces the first animation component in the animation; and
 wherein:
  the user interface comprises a grid of display elements;
  the user selection of the events comprises selection of individual events for individual ones of the display elements; and
  the display elements are organized in a temporal sequence to represent the temporal occurrence of the events selected for the display elements.

2. The system of claim 1, wherein the second animation component is the first animation component having one or more substituted values of one or more animation parameters.

3. The system of claim 1, wherein:
 the events comprise a second event, the second event being associated with second event criteria; and
 wherein the one or more physical processors are further configured by machine-readable instructions to:
  receive a selection of the second event by the user such that the second event is to occur within the animation after the first event; and
  determine whether an outcome of the first event satisfies the second event criteria, the determination being based on the values of the animation parameters of the animation determined at the outcome of the first event; and
  generate the animation including at least instances of the first event and the second event based on satisfaction of the second event criteria, such that:
   responsive to determining that the second event criteria is satisfied based on the values of the animation parameters of the animation at the outcome of the first event, generate the animation including the instances of the first event and the second event; or
   responsive to determining that the second event criteria is not satisfied based on the values of the animation parameters at the outcome of the first event:
    effectuate a non-user selection of a third event, the third event being selected to occur either simultaneously with the first event, or after the first event and before the second event, the non-user selection of the third event being such that the values of the animation parameters determined at the outcome of the third event satisfy the second event criteria, and
    generate the animation including the instances of the first event, the second event, and the third event.

4. The system of claim 3, wherein responsive to receiving either the selection of the first animation component or effectuating the non-user selection of the second animation component, and responsive to determining that the second event criteria is not satisfied based on the values of the animation parameters after an occurrence of the first event including either the first animation component or second animation component, effectuate a substitution of either the selection of the first animation component or the non-user selection of the second component with another non-user selection of a third animation component, wherein the third animation component satisfies the first event criteria, and wherein the values of the animation parameters at the outcome of the first event including the third animation component satisfy the second event criteria.

5. The system of claim 1, wherein individual animation parameters include one or more actor parameters, wherein individual actor parameters are associated with the entities portrayed in the animations, and wherein the values of the individual actor parameters define abilities of an actor to interact with, manipulate, or a combination thereof, objects, other actors, or a combination thereof.

6. The system of claim 1, wherein individual animation parameters include one or more environment parameters, and wherein individual environment parameters are associated with a simulated space in which the animations take place, and wherein the values of the individual environment parameter define a topography of the simulated space.

7. The system of claim 1, wherein:
the first event criteria specifies a first set of values of a first animation parameter;
the first animation component is defined by a first value of the first animation parameter;
the second animation component is defined by a second value of the first animation parameter; and
the first set of values includes the first value and the second value.

8. The system of claim 1, wherein the grid of display elements of the user interface depicts a storyboard.

9. The system of claim 1, wherein the manners in which the individual entities interact with the other individual entities in the animation include passive actions.

10. A method to generate event-centric animations, the method being implemented in a computer system comprising one or more physical processors and storage media storing machine-readable instructions, the method comprising:
storing event information that defines events portrayed in animations, the events comprising plot points of stories conveyed in the animations, wherein individual events are associated with event criteria, and wherein the events comprise a first event associated with first event criteria;
effectuating presentation of a user interface, the user interface being configured to receive user selection of individual ones of the events portrayed in the animations and animation components to be included in the events, the animation components including entities portrayed in the animations, wherein individual animation components are defined by values of animation parameters, wherein the animation parameters include one or more object parameters, and wherein individual object parameters are associated with the individual ones of the entities portrayed in the animations, and wherein the values of the individual object parameters define manners in which individual entities interact with other individual entities in the animation;
determining whether the animation components selected by a user satisfy the event criteria for individual ones of selected ones of the events, the selected ones of the events including the first event; and
generating an animation including instances of the selected ones of the events based on satisfaction of event criteria of the selected ones of the events, such that:
responsive to determining that the first event criteria is satisfied based on a further selection by the user of a first animation component including a first entity, generating the animation including an instance of the first event that includes an instance of the first animation component; and
responsive to determining that the first event criteria is not satisfied based on the further selection of the first animation component including the first entity, effectuating a non-user selection of a second animation component including a second entity that has a separate visual depiction from the first entity, wherein the second animation component is defined by the values of the animation parameters that satisfy the first event criteria, and generating the animation including an instance of the first event that includes an instance of the second animation component,
wherein the second animation component replaces the first animation component in the animation; and
wherein:
the user interface comprises a grid of display elements;
the user selection of the events comprises selection of individual events for individual ones of the display elements; and
the display elements are organized in a temporal sequence to represent the temporal occurrence of the events selected for the display elements.

11. The method of claim 10, wherein the second animation component is the first animation component having one or more substituted values of one or more animation parameters.

12. The method of claim 10, wherein the events comprise a second event, the second event being associated with second event criteria, and wherein the method further comprises:
receiving a selection of the second event by the user via the user interface such that the second event is to occur within the animation after the first event;
determining whether an outcome of the first event satisfies the second event criteria, the determination being based on the values of the animation parameters of the animation determined at the outcome of the first event; and
generating the animation including at least instances of the first event and second event based on satisfaction of the second event criteria, such that:
responsive to determining that the second event criteria is satisfied based on the values of the animation parameters of the animation at the outcome of the first event, generating the animation including the instances of the first event and the second event; or
responsive to determining that the second event criteria is not satisfied based on the values of the animation parameters at the outcome of the first event:
effectuating a non-user selection of a third event, the third event being selected to occur either simultaneously with the first event, or after the first event and before the second event, the non-user selection of the third event being such that the values of the animation parameters determined at the outcome of the third event satisfy the second event criteria, and
generating the animation including the instances of the first event, the second event, and the third event.

13. The method of claim 12, wherein responsive to receiving either the selection of the first animation component or effectuating the non-user selection of the second animation component, and responsive to determining that the second event criteria is not satisfied based on the values of the animation parameters after an occurrence of the first event including either the first animation component or second animation component, effectuate a substitution of either the selection of the first animation component or the non-user selection of the second component with another non-user selection of a third animation component, wherein the third animation component satisfies the first event criteria, and wherein the values of the animation parameters at the outcome of the first event including the third animation component satisfy the second event criteria.

14. The method of claim 10, wherein individual animation parameters include one or more actor parameters, wherein individual actor parameters are associated with the entities portrayed in the animations, and wherein the values of the individual actor parameters define abilities of an actor to interact with, manipulate, or a combination thereof, objects, other actors, or a combination thereof.

15. The method of claim 10, wherein individual animation parameters include one or more environment parameters, and wherein individual environment parameters are associated with a simulated space in which the animations take place, and wherein the values of the individual environment parameter define a topography of the simulated space.

16. The method of claim 10, wherein:
- the first event criteria specifies a first set of values of a first animation parameter;
- the first animation component is defined by a first value of the first animation parameter;
- the second animation component is defined by a second value of the first animation parameter; and
- the first set of values includes the first value and the second value.

17. The method of claim 10, wherein the grid of display elements of the user interface depicts a storyboard.

18. The method of claim 10, wherein the manners in which the individual entities interact with the other individual entities in the animation include passive actions.

* * * * *